United States Patent
Ooyama et al.

[11] Patent Number: 6,105,453
[45] Date of Patent: Aug. 22, 2000

[54] CONTROL SYSTEM FOR AUTOMATIC VEHICLE TRANSMISSION WITH SEPARATE RANGE SELECTOR SOLELY FOR ESTABLISHING PARKING RANGE

[75] Inventors: Kazuo Ooyama; Takamichi Shimada, both of Wako, Japan

[73] Assignee: Honda Giken Kogyo Kabushiki Kaisha, Tokyo, Japan

[21] Appl. No.: 09/353,280

[22] Filed: Jul. 14, 1999

[30] Foreign Application Priority Data

Jul. 15, 1998 [JP] Japan .................................. 10-214773

[51] Int. Cl.⁷ .................................................. F16H 59/08
[52] U.S. Cl. .................. 74/473.3; 74/335; 74/473.12; 74/473.16; 74/473.31; 192/219.5
[58] Field of Search ................................ 192/218, 219.5; 74/473.12, 473.16, 473.22, 473.3, 473.31, 335

[56] References Cited

U.S. PATENT DOCUMENTS

| | | | |
|---|---|---|---|
| Re. 34,064 | 9/1992 | Tury et al. ................................ | 74/335 |
| 3,001,618 | 9/1961 | McCordic et al. ..................... | 192/219.5 |
| 3,465,559 | 9/1969 | Rhodes et al. ........................ | 74/473.3 X |
| 4,250,768 | 2/1981 | Hildebrecht ........................... | 74/473.16 X |
| 5,161,422 | 11/1992 | Suman et al. ........................ | 74/335 |
| 5,660,080 | 8/1997 | Rector et al. ........................ | 74/335 X |
| 5,887,694 | 3/1999 | Kruger ................................. | 74/473.3 X |

FOREIGN PATENT DOCUMENTS

| | | |
|---|---|---|
| 7-251645 | 10/1995 | Japan . |
| 7-253149 | 10/1995 | Japan . |
| 7-253150 | 10/1995 | Japan . |
| 7-253151 | 10/1995 | Japan . |
| 7-253155 | 10/1995 | Japan . |

*Primary Examiner*—Charles A. Marmor
*Assistant Examiner*—Ankur Parekh
*Attorney, Agent, or Firm*—Arent Fox Kintner Plotkin & Kahn, PLLC

[57] ABSTRACT

A control system for an automatic vehicle transmission having a parking lever provided at a position close to the vehicle operator seat of the vehicle to be manipulated by the vehicle operator and mechanically connected to a parking mechanism connected to the transmission output shaft, for enabling to operate the parking mechanism to lock the output shaft such that a parking range is established, and a range selector comprising an electric switch provided at a position close to the vehicle operator and electrically connected to a hydraulic mechanism of the automatic transmission such that any of the other gear ranges can be selected by the vehicle operator, thereby enlarging free space around the vehicle operator seat by removing the console-type range selector, without needing an actuator such as an electric motor for moving the manual valve or the parking mechanism so as to eliminate the problem when the on-board battery is discharged.

8 Claims, 8 Drawing Sheets

CONTROL SYSTEM FOR AUTOMATIC VEHICLE TRANSMISSION WITH SEPARATE RANGE SELECTOR SOLELY FOR ESTABLISHING PARKING RANGE

BACKGROUND OF THE INVENTION

1. Field of the Invention

This invention relates to a control system for an automatic vehicle transmission.

2. Description of the Related Art

A conventional automatic vehicle transmission has a console-type range selector which is installed in a console box provided at the floor close to the vehicle operator seat. The console type range selector is mechanically connected to a hydraulic valve (i.e., the manual valve) in a hydraulic mechanism in order that a desired one from among various gear ranges is selected by the vehicle operator through manipulation of a lever of the range selector. The range or position selected by the vehicle operator is detected by a position switch which generates and sends a signal indicative of the selected range to a control unit of the hydraulic mechanism where necessary control is conducted.

On the other hand, in order to enlarge free space around the vehicle operator seat, it has been proposed to provide, instead of the console-type range selector, a range selector switch (an electric switch) at or near the steering wheel, etc., as well as an electric motor for moving the manual valve or a parking mechanism in the so-called DBW (Drive By Wire) fashion. This is disclosed, for example, in Japanese Laid-Open Patent Application Nos. Hei 7 (1995)-253149, Hei 7 (1995)-253150, Hei 7 (1995)-253151, Hei 7 (1995)-253155, and Hei 7 (1995)-251645.

Since, however, these prior art systems are configured such that the parking mechanism is to be driven by an electric motor, the prior art systems require an electric motor of large power. This is disadvantageous in that it increases consumption of electric power supplied from the on-board battery and needs a large space to accommodate the electric motor.

Moreover, the prior art systems are disadvantageous in that they require the same number of sensors as that of ranges (positions) to detect the range (position) selected by the vehicle operator.

Furthermore, the prior art systems are disadvantageous in that, if the battery is completely discharged, it becomes impossible to release the parking mechanism to move the vehicle. The vehicle operator will encounter a similar problem when trying to park the vehicle with a discharged battery.

SUMMARY OF THE INVENTION

An object of this invention is therefore to overcome this drawbacks of the prior art and to provide a control system for an automatic vehicle transmission, which can enlarge free space around the vehicle operator seat by removing the console-type range selector, without needing an actuator such as an electric motor for moving the manual valve or the parking mechanism so as to eliminate the problem when the on-board battery is discharged.

To achieve this object, the invention provides a system for controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft when a forward-running range is selected by a vehicle operator, wherein the improvement comprises: a first range selecting means provided at a position close to the vehicle operator seat of the vehicle to be manipulated by the vehicle operator and mechanically connected to a parking mechanism connected to the output shaft, for enabling operation, in response to manipulation by the vehicle operator, of the parking mechanism to lock the output shaft such that a parking range is established; first signal generating means for generating, in response to operation of the parking mechanism, a first signal indicating that the parking range is selected by the vehicle operator; second range selecting means provided at a position close to the vehicle operator seat to be manipulated by the vehicle operator and electrically connected to a hydraulic mechanism of the automatic transmission, for generating a second signal indicating that one of manual ranges including at least the forward-running range and a neutral range is selected by the vehicle operator; and control means for controlling operation of the hydraulic mechanism in response to the second signal such that the selected range is established, when the first signal is not generated.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

Embodiments of the invention will now be explained with reference to the attached drawings.

Figure 1:
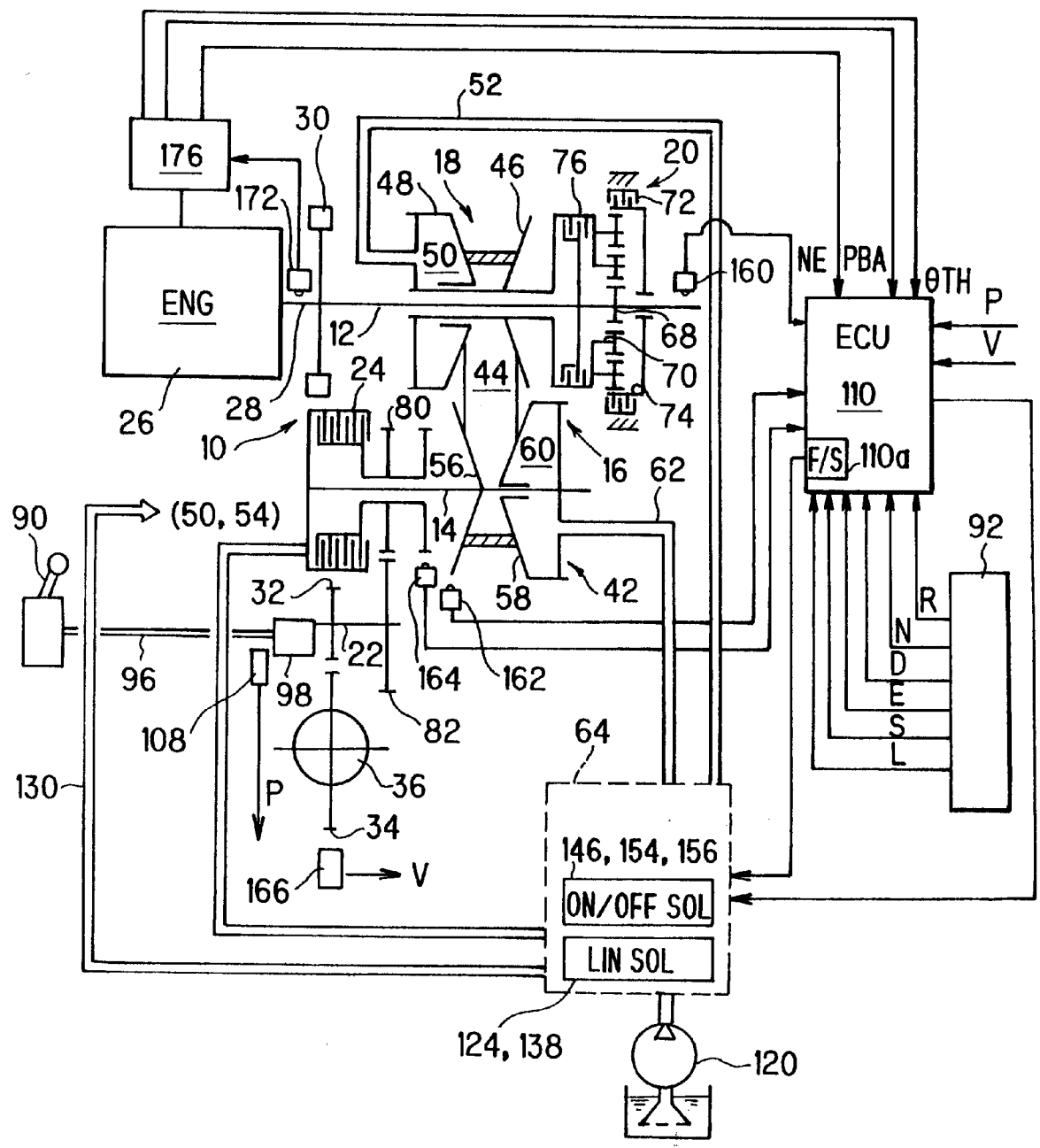
FIG. 1 is an overall schematic view showing a control system for an automatic vehicle transmission, taking a Continuously Variable Transmission (CVT) as an example.

FIG. 1 is an overall schematic view showing a control system for an automatic vehicle transmission according to the invention, taking a belt-drive Continuously Variable Transmission (hereinafter referred to as "CVT" assigned with reference numeral 10).

The CVT 10 will be explained first.

The CVT 10 comprises a metal V-belt mechanism 16 located between a transmission input shaft 12 and a counter shaft 14, a planetary gear-type forward/reverse switching mechanism 20 located between the transmission input shaft 12 and a drive-pulley 18, and a start clutch 24 located between the counter shaft 14 and a transmission output shaft 22.

An output shaft (crankshaft) 28 of an internal combustion engine 26 (shown as "ENG" in the figure) is connected to the transmission input shaft 12 of the CVT 10 through a dual-mass flywheel 30 such that the engine power is transmitted. The transmitted power is transferred from the transmission output shaft 22 to a differential mechanism 36 through gears 32, 34 and drives left and right driven wheels (not shown) connected to the differential mechanism 36 through drive shafts (not shown).

The metal V-belt mechanism 16 comprises the drive-pulley 18 mounted on the transmission input shaft 12, a driven-pulley 42 mounted on the counter shaft 14, and a metal V-belt 44 wound about the two pulleys. The drive-pulley 18 comprises a fixed pulley half 46 mounted on the transmission input shaft 12 and a movable pulley half 48 movable on the shaft 12 relative to the fixed pulley half 46 in the axial direction.

On the side of the movable pulley half 48 is formed a cylinder chamber 50. Hydraulic (oil) pressure supplied to the cylinder chamber 50 through a hydraulic pressure line (passage) 52 produces lateral pressure for moving the movable pulley half 48 in the axial direction.

The driven-pulley 42 comprises a fixed pulley half 56 mounted on the counter shaft 14 and a movable pulley half 58 movable on the shaft 14 relative to the fixed pulley half 56 in the axial direction. On the side of the movable pulley half 58 is formed a cylinder chamber 60. Hydraulic pressure supplied to the cylinder chamber 60 through a hydraulic pressure line (passage) 62 produces lateral pressure for moving the movable pulley half 58 in the axial direction.

The CVT 10 is connected to a hydraulic mechanism 64 to be supplied with the hydraulic pressures as mentioned above and is controlled to appropriate lateral pulley pressures at which no V-belt 44 slip occurs. The CVT 10 is controlled to vary the width of the pulleys 18, 42 to change the radius of the V-belt 44 wound about the pulleys 18, 42, thereby continuously varying the speed ratio (gear ratio).

The planetary gear-type forward/reverse switching mechanism 20 comprises a sun gear 68 connected to the transmission input shaft 12, a carrier 70 connected to the fixed pulley half 46, a ring gear 74 that is immobilized by a reverse brake 72, and a forward clutch 76 that connects the sun gear 68 and the carrier 70.

When the forward clutch 76 is engaged, all gears (sun gear 68, carrier 70 and ring gear 74) rotate unitarily with the transmission input shaft 12 to drive the drive-pulley 18 in the same direction (forward) as the transmission input shaft 12. In the illustrated example having a double pinion planetary gear, if the reverse brake 72 is engaged, it immobilizes the ring gear 74 so that the carrier 70 is driven reversely from the sun gear 68 and the drive-pulley 18 is driven in the opposite direction (reverse) from the transmission input shaft 12.

When both the forward clutch 76 and the reverse brake 72 are disengaged, the transmission of power through the forward/reverse switching mechanism 20 is cut off and no power is transmitted between the engine 26 and the drive-pulley 18.

The start clutch 24 is a clutch for ON/OFF (engage/disengage) control of power transmission between the counter shaft 14 and the transmission output shaft 22. When it is ON (engaged), power can be transmitted between them. Therefore, when the start clutch 24 is ON, the engine output varied in speed ratio by the metal V-belt mechanism 16 is transmitted through the gears 80 and 82 to the differential mechanism 36, which distributes it to the left and right driven wheels. When the start clutch 24 is OFF (disengaged), this power transmission is not effected and the transmission assumes a neutral state.

Figure 2:
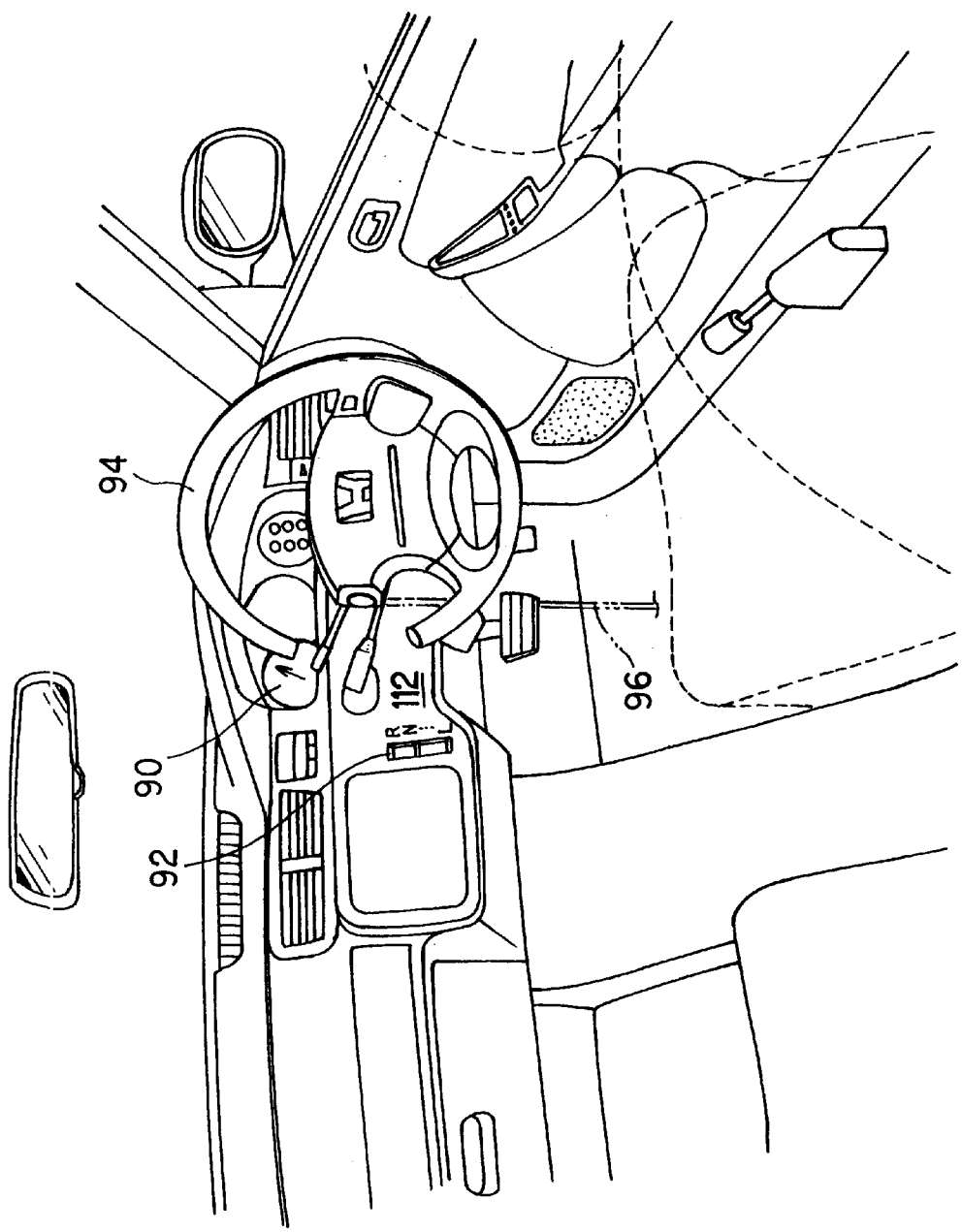
FIG. 2 is an explanatory perspective view of the vehicle driver seat showing the location of the parking lever and the range selector illustrated in FIG. 1.

In the system according to this embodiment, as will be best shown in FIG. 2, at or near the vehicle operator seat, a parking lever 90 is installed for enabling the vehicle operator to select the parking range P. And a range selector (comprising an electric switch 92) is provided at a similar position (i.e., at the front panel) for enabling the vehicle operator to select one from among various gear ranges not including the parking range P (sometimes referred to as "manual range") but including the forward-running ranges D, E, S, L, the neutral range N and the reverse range R.

Here, D indicates the driving range in which gearshift is effected based on ordinary gearshift scheduling characteristics, E indicates that based on characteristics excellent in fuel consumption, S indicates that based on characteristics excellent in driving performance (response) and L indicates that based on characteristic in which engine braking effect is increased.

Figure 3:
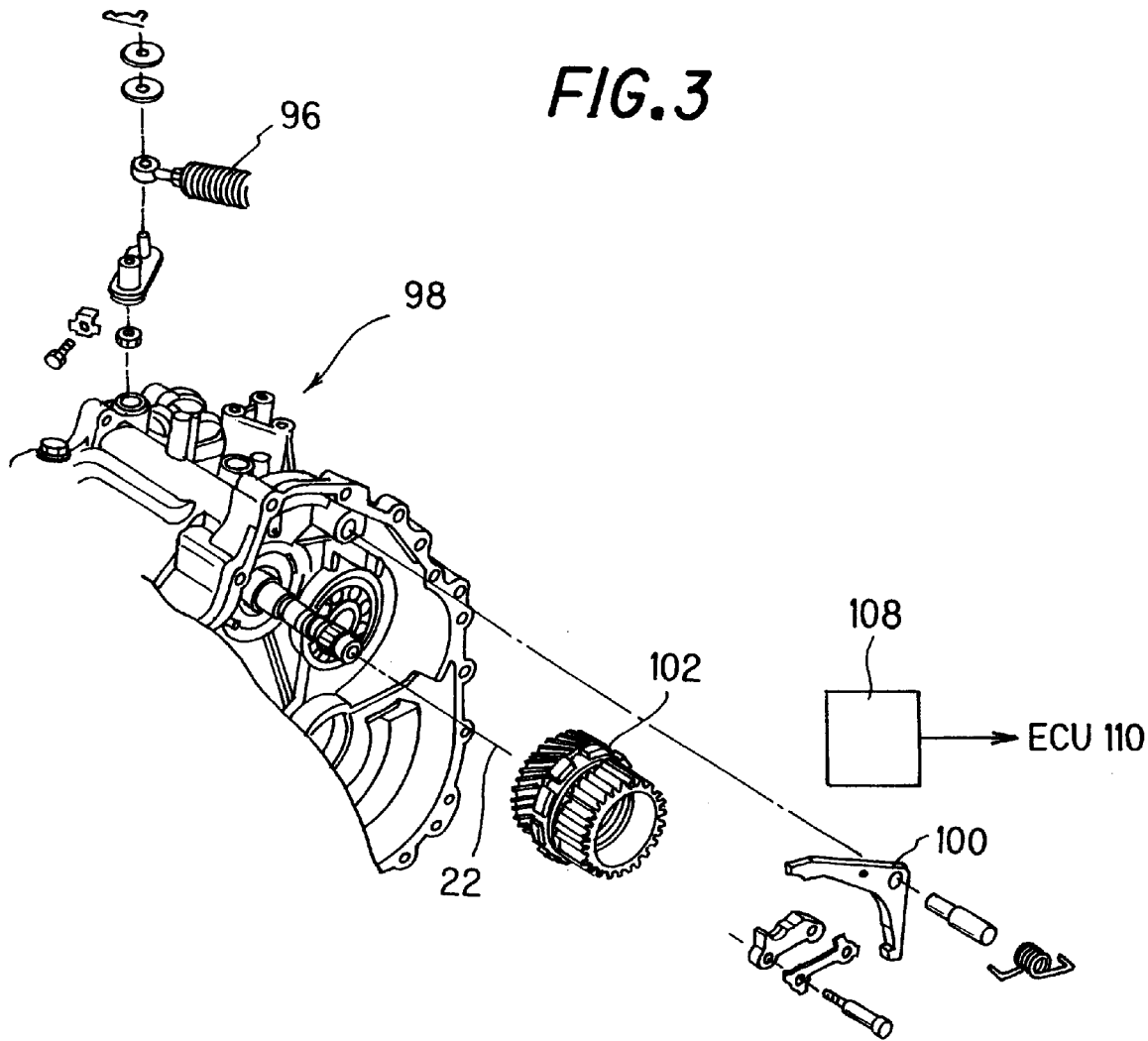
FIG. 3 is an explanatory perspective view of the parking mechanism to which the parking lever illustrated in FIG. 2 is connected.

As shown in FIG. 2, the parking lever 90 is attached to a steering column (hidden in the figure) to which a steering wheel 94 is connected. The parking lever 90 is mechanically connected to a parking mechanism 98 (shown in FIG. 3) through a cable 96. Explaining with reference to FIGS. 2 and 3, when the vehicle operator pulls the parking lever 90, the pulling force is transmitted to the parking mechanism 98 via the cable 96 such that a parking brake pawl 100 meshes with a parking gear 102 (connected to the transmission output shaft 22) to lock the shaft 22.

A parking switch 108 is provided near the parking brake pawl 100. When the transmission output shaft 22 is locked, it generates a parking (range) signal P indicative of shaft locking and sends the signal to an Electronic Control Unit (ECU) 110. The ECU 110 comprises a microprocessor and controls speed ratio (gear ratio) through the CVT 10 and the hydraulic mechanism 64.

Figure 4:
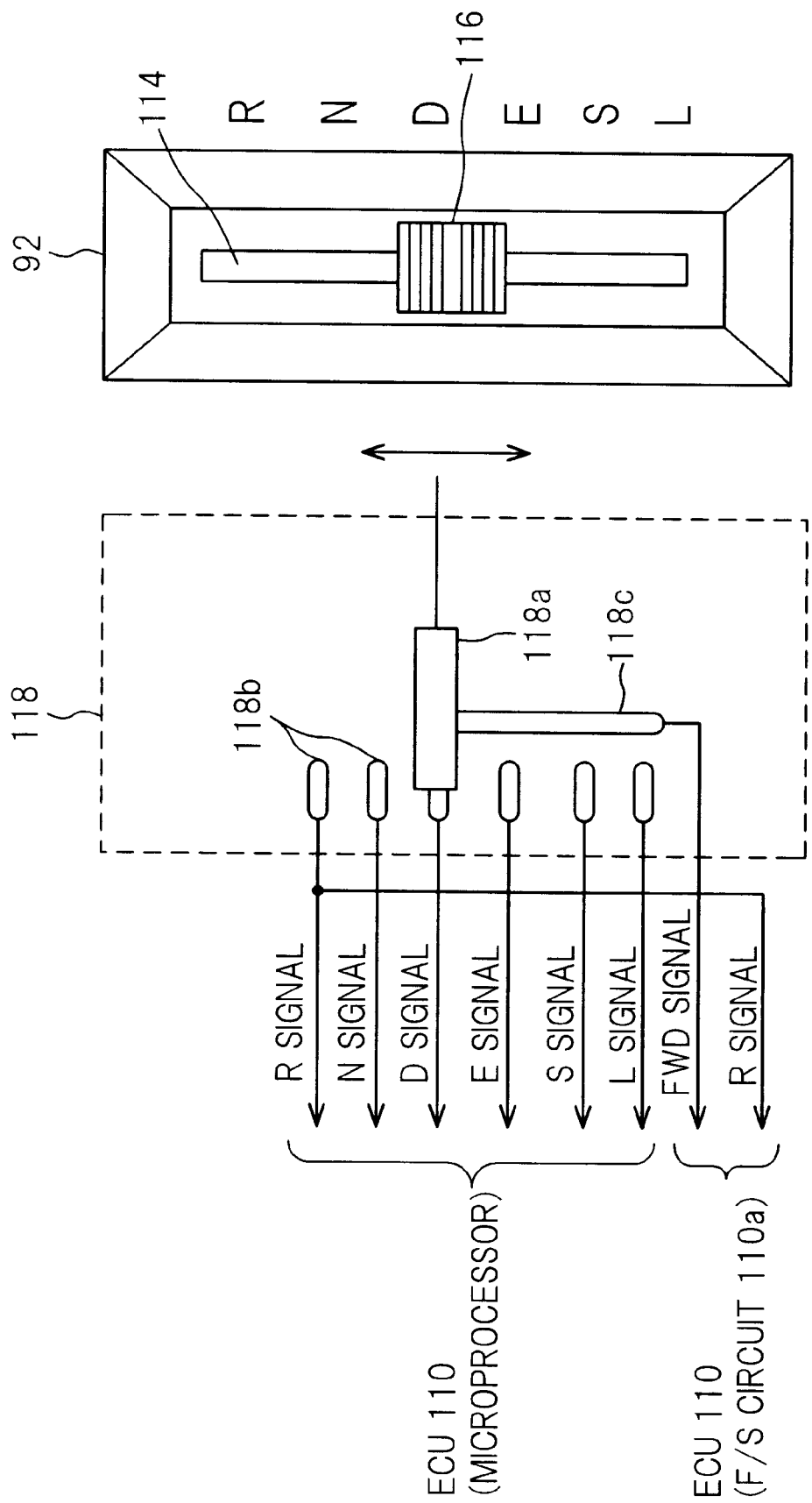
FIG. 4 an explanatory view showing the range selector illustrated in FIG. 2 and a range signal generator electrically connected thereto.

As shown in FIG. 2, the range selector 92 is a panel-type one and is installed on an instrumental panel 112 at the dash board near the vehicle driver seat. To be more specific, as illustrated in FIG. 4, the range selector 92 has a knob 116 which is movable in a slot 114 provided on the selector 92. The knob 116 moves stepwise in response to the vehicle operator's finger manipulation such that it stops at any position corresponding to the ranges R, N, D, E, S, L.

The knob 116 is electrically connected to a range signal generator 118. The range signal generator 118 has an electrode 118a electrically connected to the knob 116, and a plurality of electric contacts 118b corresponding to the ranges. When the vehicle operator manually adjusts the knob 116, the electrode 118a is brought into contact with any of the contacts 118b, generating a signal corresponding to the range. The signal is sent to the ECU 110 and is inputted to the microprocessor where the range selected by the vehicle operator is detected.

The signal generator 118 also generates a forward FWD signal when one among from the forward-running ranges D, E, S, L is selected through an extension 118c or a reverse R signal when the R range is selected. The FWD or R signal is sent to the ECU 110 and is inputted to a F/S (Failsafe) circuit 110a (which is an electric circuit including a relay, etc). If the microprocessor breaks down the F/S circuit 110a operates to control the vehicle to move, as will be explained later.

The aforesaid hydraulic mechanism 64 will be explained.

Figure 5:
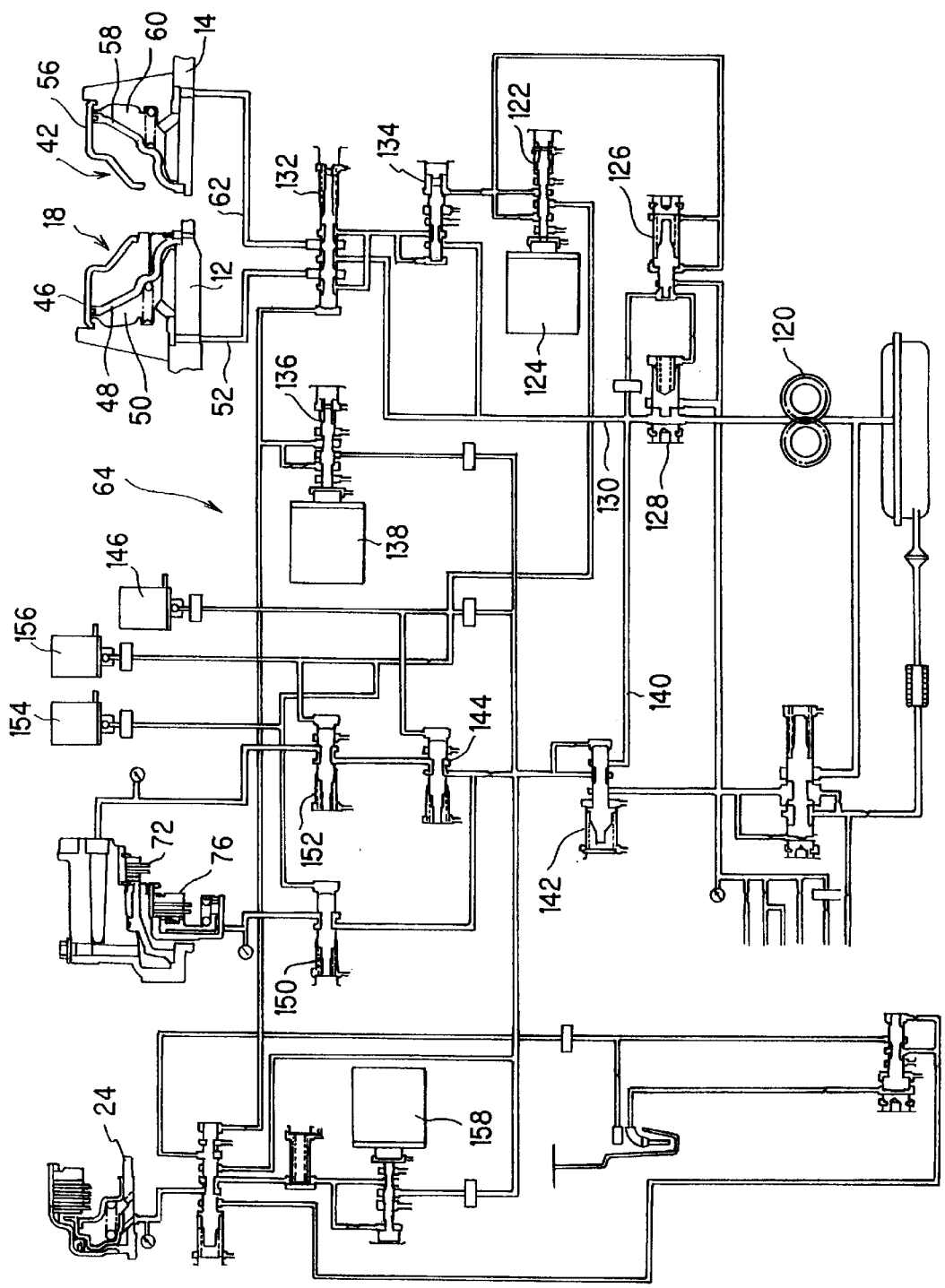
FIG. 5 is a hydraulic circuit diagram showing the configuration of the hydraulic mechanism illustrated in FIG. 1.

FIG. 5 is a hydraulic circuit diagram showing the configuration of the hydraulic mechanism 64 in detail.

As illustrated, oil (Automatic Transmission Fluid) pumped by an oil pump 120 from the tank (reservoir) is regulated to a predetermined high pressure PH and is supplied to a path 130 by a PH control valve 126 and a PH regulator valve 128 through the operation of a linear solenoid 124 of a PH-PL control valve 122 which operates in response to a command sent from the ECU 110.

The path 130 is connected, at one end, to an input port of a shift valve 132 to supply the high pressure PH oil and is branched to be connected, at the other end, to a PL regulator valve 134. The PL regulator valve 134 reduces the oil pressure to a predetermined pressure PL (lower than PH) and supplies the pressure PL oil to another input port of the shift valve 132.

The shift valve 132 is connected to a shift control valve 136. The shift control valve 136 supplies the oil pressure, in response to its spool position determined by the plunger of a linear solenoid 138 (which operates in response to the command sent from the ECU 110), to the shift valve 132 to determine its spool position such that the oil (whose pressure is regulated between PH and PL in response to the vehicle operating conditions) is supplied to the drive-pulley 18 and the driven-pulley 42.

Since the ECU 110 is supplied with the battery voltage (approximately 12V) the level of the respective commands which the ECU 110 sends to solenoids (including the aforesaid linear solenoids) are set to be at 12V or thereabout.

The PH pressure oil is also supplied to a clutch reducing valve 142 through a path 140 and is reduced there to a clutch pressure CR. The reduced pressure oil CR is then supplied to the input port of an inhibitor valve 144. The inhibitor valve 144 has an inhibitor solenoid INHSOL (ON/OFF solenoid in the normally-closed type) 146 which is electrically connected to the ECU 110.

In the inhibitor valve 144, the spool is at the position illustrated in the figure unless the inhibitor solenoid 146 is made ON by the ECU 110, and supplies the CR pressure oil to the input port of a reverse brake valve 152. In other words, the inhibitor valve 144 operates as a reverse inhibitor valve.

The hydraulic mechanism 64 includes a forward clutch valve 150 which has a forward solenoid FWDSOL (ON/OFF solenoid in the normally-closed type) 154 electrically connected to the ECU 110.

Similarly, the reverse brake valve 152 has a reverse solenoid RVSSOL (ON/OFF solenoid in the normally-closed type) 156 electrically connected to the ECU 110.

As will be explained later, when the selected range is any of the forward-running ranges (D, E, S, L), the ECU 110 turns the inhibitor solenoid 146 off/on in response to the vehicle speed, while turning the reverse solenoid 156 on and turning the forward solenoid 154 off. At that state, the spool of the forward clutch 150 is at the position illustrated in the figure to supply the CR pressure oil to the forward clutch 76 such that the clutch 76 is engaged.

When the selected range is the reverse range R, the ECU 110 turns the inhibitor solenoid 146 off, while turning the forward solenoid 154 on and turning the reverse solenoid 156 off. At that state, the spool of the reverse brake valve 152 is at the position illustrated in the figure to supply the CR pressure oil to the reverse brake 72 such the brake 72 is engaged.

When the inhibitor solenoid 146 is turned on by the ECU 110, the spool of the inhibitor 144 moves right (in the figure) such that the CR pressure oil is connected to the drainage port and the supply of oil pressure to the reverse brake valve 152 is discontinued. Thus, the engagement of the reverse brake 72 is inhibited by the inhibitor solenoid 146.

Since the forward solenoid 154 and the reverse solenoid 156 are the ON/OFF type solenoids, the ECU 110 can determine that the reverse range R is selected when the forward solenoid 154 is turned on, and that any of the forward-running ranges (D, E, S, L) is selected when the reverse solenoid 156 is turned on. Therefore, it is unnecessary to provide sensors respectively for determining the range selected by the vehicle operator.

Moreover, by turning the inhibitor solenoid 146 on, when the vehicle runs forward at a speed greater or equal to a predetermined vehicle speed, the reverse brake 72 will not be engaged even if any member such as the reverse solenoid 154 malfunctions.

Returning to the explanation of FIG. 1, a speed sensor 160 is provided in the vicinity of the transmission input shaft 12 for generating a signal indicative of its rotational speed NDR, a second speed sensor 162 is provided in the vicinity of the driven-pulley 42 for generating a signal indicative of its rotational speed, i.e., the rotational speed NDN of the input rotation of the start clutch 24, and a third speed sensor 164 is provided in the vicinity of the gear 82 for generating a signal indicative of its rotational speed, i.e., the rotational speed NOUT of the transmission output shaft 22.

A vehicle speed sensor 166 is provided in the vicinity of the driver shaft for generating a signal indicative of the traveling speed V of the vehicle. (The third speed sensor 164 can be used for this purpose). The outputs of these sensors are sent to the ECU 110.

An engine speed sensor 172 is provided in the vicinity of the output shaft (crankshaft) 28 of the engine 26 for generating a signal indicative of the engine speed NE. An absolute manifold pressure sensor (not shown) is provided at an appropriate location of the intake pipe (not shown) downstream of the throttle valve (not shown) of the engine 26 for generating a signal indicative of the manifold absolute pressure PBA, and a throttle position sensor (not shown) is provided for generating a signal indicative of the throttle opening θ TH. The outputs of these sensors are sent to a second Electronic Control Unit (ECU) 176 for controlling the engine operation. The second ECU 176 sends the sensor outputs to the ECU 110.

Figure 6:
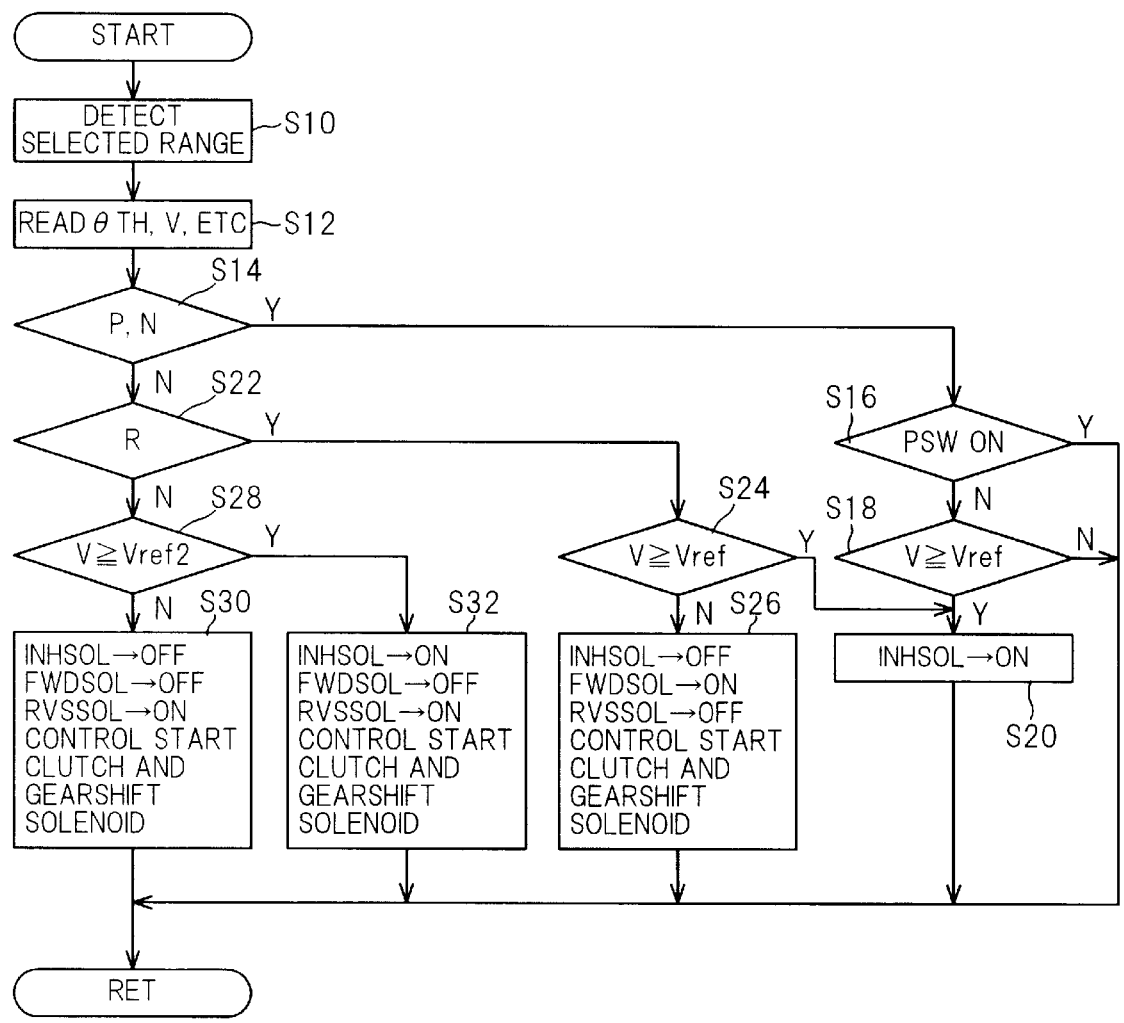
FIG. 6 is a flow chart showing the operation of the system illustrated in FIG. 1.

The operation of the system, more precisely, the operation of the ECU 110 will be explained with reference to the flow chart of FIG. 6. The program illustrated there is executed once every 10 msec.

The program begins in S10 in which it is determined which range (position) is selected by the vehicle operator based on the outputs of the range selector 92 and the parking switch 108.

The program then proceeds to S12 in which the detected throttle opening θ TH and the vehicle speed V, etc., are read, to S14 in which it is determined whether the determined range is P or N. When the result is affirmative, the program proceeds to S16 in which it is determined whether the parking switch 108 is turned on. When the result is affirmative, since this means that the selected range is P, the program is immediately terminated.

When the result in S16 is negative, since this means that the selected range in N, the program proceeds to S18 in which it is determined whether the detected vehicle speed V is greater or equal to a predetermined vehicle speed Vref (e.g., 2 km/h). When the result is negative, since this means that the vehicle is stopped or is almost stopping and no control is needed, the program is immediately terminated.

When the result in S18 is affirmative, since this means that the vehicle is moving despite the fact that the selected range is N, the program proceeds to S20 in which the inhibitor solenoid (INHSOL) 146 is turned on. With this, the engagement of the reverse brake 72 is inhibited, as mentioned above.

When the result in S14 is negative, the program proceeds to S22 in which it is determined whether the detected range is R and if it is, the program proceeds to S24 in which it is determined whether the detected vehicle speed V is greater or equal to the predetermined vehicle speed Vref. (The detected vehicle speed V and the predetermined vehicle speed Vref indicates a traveling speed when the vehicle runs forward.)

When the result in S24 is affirmative, since this means that the vehicle is running forward, the program proceeds to S20 in which the inhibitor solenoid (INHSOL) 146 is turned on to inhibit the reverse gear from being established.

On the other hand, when the result in S24 is negative, the program proceeds to S26 in which the inhibitor solenoid (INHSOL) 146 is turned off, the forward solenoid (FWDSOL) 154 is turned on, and the reverse solenoid (RVSSOL) 156 is turned off.

At the same time, the start clutch 24 is controlled through a start-clutch-control solenoid 158 (shown in FIG. 5), and the gearshift solenoids i.e. the linear solenoids 124 and 138, more specifically, the linear solenoid 138 is duty-ratio controlled, i.e., is controlled in Pulse Width Modulation in order that a predetermined relatively great speed ratio is established at reverse running of the vehicle.

With this, the reverse gear is established. Although not shown, the establishment of the ranges R, etc., may be informed to the vehicle operator using a visible or audible indicator.

When the result in S22 is negative, since this means that the selected range is one among from D, E, S, L of the forward-running ranges, the program proceeds to S28 in which it is determined whether the detected vehicle speed V is greater or equal to a predetermined vehicle speed Vref2 (e.g., 10 km/h).

When the result is negative, the program proceeds to S30 in which the inhibitor solenoid (INHSOL) 146 is turned off, the forward solenoid (FWDSOL) 154 is turned off, and the reverse solenoid RVSSOL 156 is turned on.

At the same time, the start clutch 24 is controlled through the start-clutch-control solenoid 158, and a desired speed ratio (gear shift) is retrieved from a gearshift scheduling map (corresponding to the selected range) using the detected vehicle speed V and throttle opening θ TH as address data, and the gearshift solenoid 138 is duty-ratio controlled in order that the desired speed ratio is achieved.

More specifically, oil pressures to be supplied to the drive-pulley 18 and the driven-pulley 42 are determined in accordance with the gearshift scheduling map corresponding to one from among D, E, S, L, by the detected vehicle speed V and throttle opening θ TH, and the linear solenoid 138 of the shift-control valve 136 is duty-ratio controlled such that the determined oil pressures are effected.

When the result in S28 is affirmative, the program proceeds to S32 in which the inhibitor solenoid (INHSOL) 146 is turned on and the same procedures as those of S30 are conducted. Since the vehicle is forward running at a speed greater or equal to Vref2, the speed ratio determined from the vehicle speed V and the throttle opening θ TH is determined to be suitable for the situation. With this, the engagement of the reverse brake 72 is inhibited during forward running even if the reverse solenoid 154 and some similar elements malfunction, as mentioned above.

The failsafe control will be explained.

In the configuration disclosed, there will surely occur such a case as no range signal is generated in the course of switching among D, E, S, L. At that instant, it will suffice if the speed ratio determined up to that time should be held so as to keep the speed ratio to that time.

If the ECU 110 fails or breaks down, the range is automatically changed to N, i.e., no signal condition. Even under this situation, the control should be effected to enable the vehicle to keep running.

In view of this problem, the system according to this embodiment is configured such that the range signal generator 118 generates the signal indicative of the selected range based on the inputs and at the same time, sends another signal to the microprocessor of the ECU 110. Specifically, the system is configured such that the range signal generator 118 generates and sends the forward FWD signal when one from among D, E, S, L (forward-running ranges) is selected or the reverse R signal when the R range is selected, to the failsafe circuit 110a of the ECU 110, as failsafe signals.

More specifically, the failsafe circuit 110a monitors whether the respective commands sent from the ECU 110 to the hydraulic mechanism 64 through drivers (not shown) are at the voltage level of 12V or thereabout. If the command signal is monitored to be not at this level, it determines that the microprocessor has failed and operates the hydraulic mechanism 64 to move the vehicle.

Yet more specifically, the failsafe circuit 110a turns the inhibitor solenoid 146 off, discriminates whether the input range signal is the forward FWD signal or the reverse R signal, and turns on/off the forward solenoid 154 and the reverse solenoid 156 in response to the discrimination result. And, it controls the start clutch 24 and duty-ratio controls the linear solenoid 138 to effect a predetermined relatively great speed ratio such that the vehicle runs forward to a necessary and minimum extent.

Having been configured in the foregoing manner, the control system for the automatic vehicle transmission according to this embodiment can enlarge the free space around the vehicle operator seat by providing the parking range manipulation system (i.e., the parking lever 90) separately from the other range selection system (i.e., the range selector 92). Moreover, the system can effect sure operation by controlling the forward solenoid 154 and the reverse solenoid 156 in response to the parking signal of the parking range manipulation system.

Furthermore, since the parking range manipulation system is made operable independently of the other range selection system, the system can control the transmission such that the vehicle runs forward to a necessary and minimum extent, when the microprocessor is determined to have failed based on the fact the command at 12V is not generated.

As for the separate parking range manipulation system, since the parking lever 90 is provided near the vehicle operator seat which is mechanically connected to the parking mechanism 98 through the cable 96, no electric motor is needed for operating the parking mechanism 98. This leads to a saving in electric power consumption and a saving in space. Since, the system no longer needs any actuator such as the electric motor, there is no need to address the problem of accurately positioning the parking mechanism 96.

Thus, since the parking range manipulation system is provided independently of the range selector, it becomes possible to constitute the range selector as a compact electrical switch, thereby making the structure of the system simple. Furthermore, with this, since the range selector is a compact electric switch, it can be installed at any place, thereby increasing the freedom of installation and increasing the free space around the vehicle operator seat.

The parking lever 90 may be placed at any location where it can be easily reached and pulled by the vehicle operator. Since the parking lever is manipulated only when the vehicle starts or parks, it may be placed on, for example, the steering column as illustrated. If doing so, since the lever 90 is independent of the range selector, it will not restrict the vehicle operators manipulation of the range selector 92.

Furthermore, since it can be detected whether the selected range is one from among the forward-running ranges (D, E, S, L) or the reverse range R based on the energization/deenergization states of the forward solenoid 154 and the reverse solenoid 156, it becomes possible to reduce the number of sensors for sensing the same.

Furthermore, even if the on-board battery is completely discharged, the vehicle operator can easily release the locking of parking mechanism 98 by manipulating the parking lever 90 by hand. With this, the vehicle can be moved by pushing or pulling from outside.

In the above, it should be noted that, if the parking range signal is generated when the vehicle speed is less than a prescribed speed, the system may be configured to inhibit the establishment of the forward-running ranges. Moreover, it is alternatively possible to forcibly establish the N range at that time, if the N range is not selected.

Figure 7:
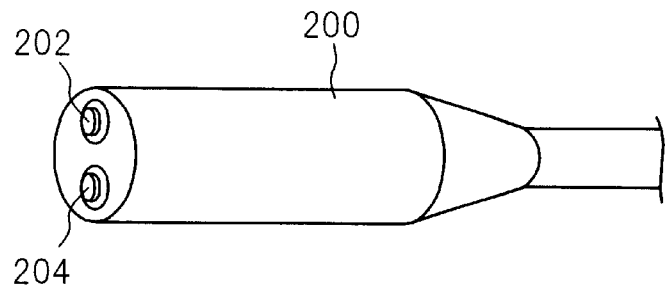
FIG. 7 is an explanatory perspective view showing the range selector of a control system for an automatic vehicle transmission according to a second embodiment of the invention.

FIG. 7 is a explanatory perspective view of the range selector of the control system for an automatic vehicle transmission according to a second embodiment of the invention.

In the second embodiment, the range selector is constituted, instead of the panel-type as disclosed in the first embodiment, as electrical switches 202, 204 in a push-button type arrangement provided at the distal end of a wiper switch knob 200 attached to the steering column (not shown). The switches 202, 204 generates signals when pushed by the vehicle operator.

Figure 8:
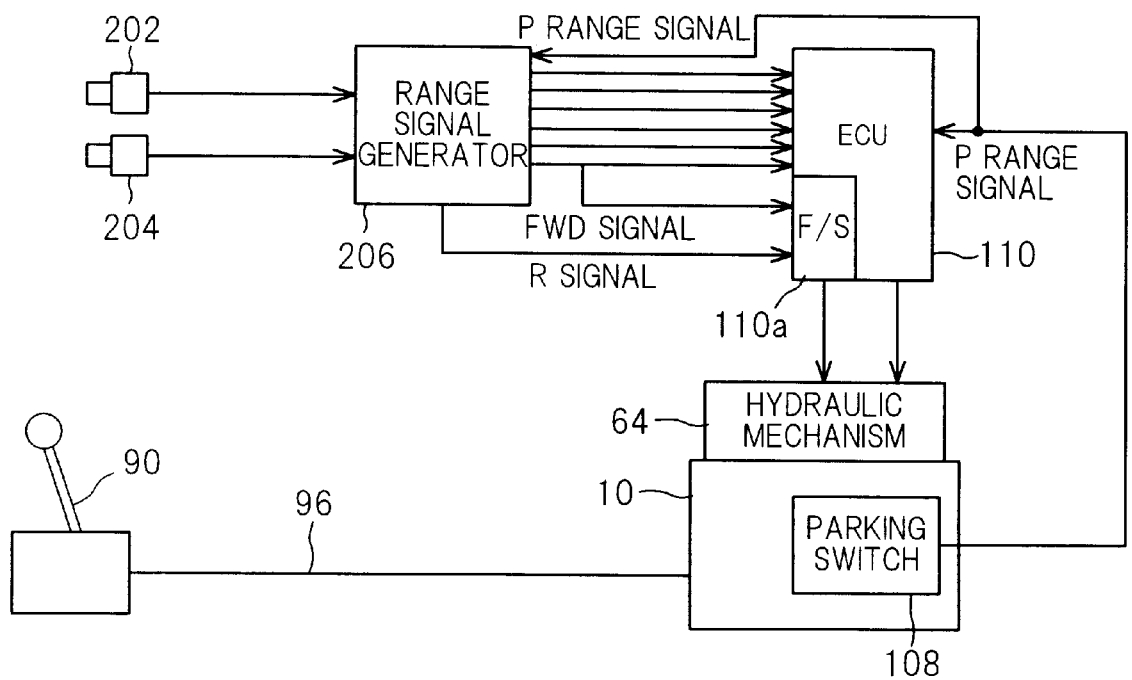
FIG. 8 is an overall schematic view showing the system according to the second embodiment of the invention.

FIG. 8 is a view, similar to FIG. 4, but schematically showing the almost overall configuration of the system according to the second embodiment.

As illustrated, the outputs of the switches 202, 204 are inputted to a range signal generator 206 which comprises an electric circuit. The range signal generator 206 generates the range signal successively in the order of R, N, D, E, S, L each time the switch 202 generates an output (each time switch 202 is pushed), while the range signal generator 206 generates the range signal successively in the (inverted) order of L, S, E, D, N, R each time the other switch 204 generates an output (each time switch 204 is pushed).

For the sake of failsafe, the range signal generator 206 inputs the output from the parking switch 108, generates and sends to the failsafe circuit 110a of the ECU 110, the reverse RVS signal when it generates the reverse R signal or the forward FWD signal when it generates any of D, E, S, L range signal, thereby enabling to operate the hydraulic mechanism 64 in order that the vehicle runs to a necessary and minimum extent, even if the microprocessor breaks down.

The rest of the second embodiment as well as its effect and advantages is the same as those of the first embodiment. Similarly to the first embodiment, the parking lever 90 is provided, in the second embodiment, independently of the switches 202, 204, thereby enlarging free space around the vehicle operator seat.

In the second embodiment, however, the switches 202, 204 constituting the range selector are positioned so close to each other that there will be the possibility that the vehicle operator will push the two switches at one time. If this happens, the outputs of the two switches interfere with each other. It will accordingly be preferable to constitute the range signal generator 206 not from the electric circuit, but from a second microprocessor such that the second microprocessor monitors the switch outputs and determines one of the switch outputs effective so as to avoid the interference which occurs when the two switches generate the outputs concurrently. For example, if one switch generates an output, while the other switch generates an output within a certain time since the one switch was made on, the second microprocessor may determine the output of the one switch effective.

Figure 9:
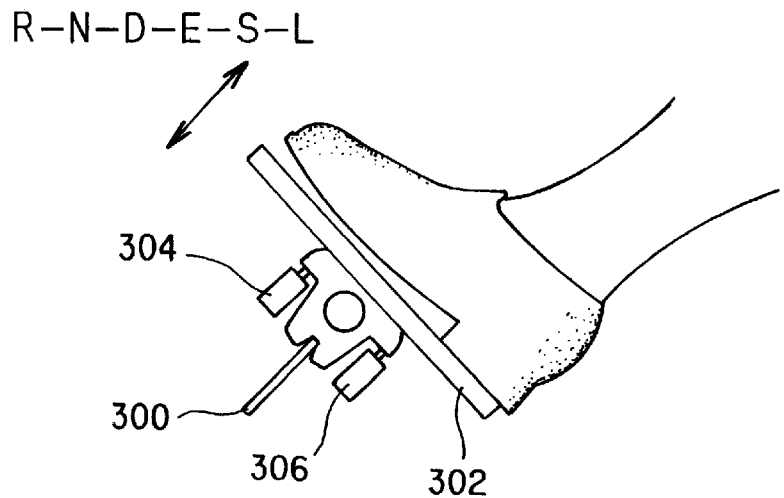
FIG. 9 is a explanatory side view showing the range selector of a control system for an automatic vehicle transmission according to a third embodiment of the invention.

FIG. 9 is a explanatory side view of the range selector of the control system for an automatic vehicle transmission according to a third embodiment of the invention.

In the third embodiment, the range selector is constituted, instead of the panel-type as disclosed in the first embodiment, as electrical switches provided on the vehicle floor such that the vehicle operator can handle it with his foot not used for vehicle manipulation. More specifically, a pedal 302 is provided on the vehicle floor through a leaf spring 300 in such a manner that depression of the pedal 302 in the to-or-fro direction (as shown by arrows in the figure) turns one of electric switches 304, 306 on. The switch outputs are inputted to a range signal generator (not shown, but similar to that disclosed in the second embodiment) which generates the range signals in response to the switch outputs. The rest of the third embodiment as well as its effect and advantages is the same as those of the second embodiment.

Figure 10:
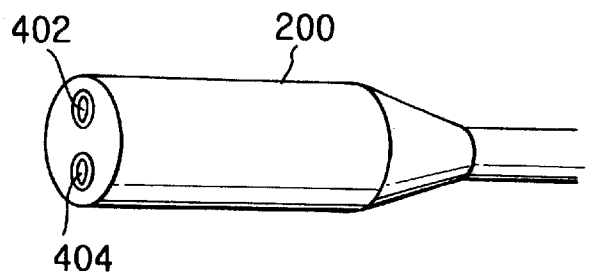
FIG. 10 is a view, similar to FIG. 7, but showing the range selector of a control system for an automatic vehicle transmission according to a fourth embodiment of the invention.

FIG. 10 is a view, similar to FIG. 7, but showing the range selector of the control system for an automatic vehicle transmission according to a fourth embodiment of the invention.

In the fourth embodiment, the range selector is constituted, instead of the push-button type, as photosensors 402, 404 provided at the distal end of the wiper switch knob 200 attached to the steering column (not shown). The photosensors 402, 404 generate signals when the vehicle operator hides them with his fingers or hand. The rest of the fourth embodiment as well as its effect and advantages is the same as those of the second embodiment.

Figure 11:
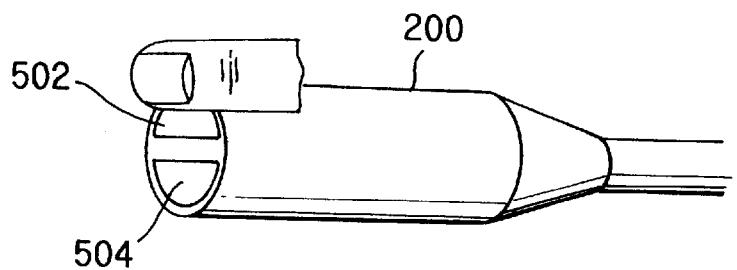
FIG. 11 is a view, similar to FIG. 7, but showing the range selector of a control system for an automatic vehicle transmission according to a fifth embodiment of the invention.

FIG. 11 is a view, similar to FIG. 7, but showing the range selector of the control system for an automatic vehicle transmission according to a fifth embodiment of the invention.

In the fifth embodiment, the range selector is constituted, instead of the push-button type, as touch-sensors 502, 504 provided at the distal end of the wiper switch knob 200 attached to the steering column (not shown). The touch-sensors 502, 504 generate signals when the vehicle operator touches them with his finger (partly shown in the figure) or hand. The rest of the fifth embodiment as well as its effect and advantages is the same as those of the second embodiment.

The first to fifth embodiments are thus configured to have a system for controlling an automatic transmission (10) of a vehicle having an input shaft (12) connected to an internal combustion engine (26) mounted on the vehicle and an output shaft (22) connected to driven wheels of the vehicle, the transmission transmitting output torque generated by the engine and inputted through the input shaft to the driven wheels through the output shaft when a forward-running range (D, E, S, L) is selected by a vehicle operator. The characteristic features of the system is that it includes: a first range selecting means (parking lever 90) provided at a position close to the vehicle operator seat of the vehicle to be manipulated by the vehicle operator and mechanically connected to a parking mechanism (98) connected to the output shaft (22), which enables operation, in response to manipulation by the vehicle operator, of the parking mechanism to lock the output shaft such that a parking range (P) is established; a first signal generating means (parking switch 108) for generating, in response to operation of the parking mechanism, a first signal indicating that the parking range is selected by the vehicle operator; second range selecting means (range selector 92, electric switches 202, 204, 304, 306, photosensors 402, 404, touch-sensors 502, 504) provided at a position close to the vehicle operator seat to be manipulated by the vehicle operator and electrically connected to a hydraulic mechanism (64) of the automatic transmission (10), for releasing the parking mechanism (98) in response to manipulation by the vehicle operator and for generating a second signal (R, N, D, E, S, L) indicating that one of manual ranges including at least the forward-running range (D, E, S, L) and a neutral range (N) is selected by the vehicle operator; and control means (ECU 110) for controlling operation of the hydraulic mechanism in response to the second signal such that the selected range is established, when the first signal is not generated.

In the system, the second range selecting means includes; an electric switch (92, 202, 204, 304, 306, 402, 404, 502, 504) provided at the position close to the vehicle operator seat and generating an output in response to manipulation by the vehicle operator; and second signal generating means (range signal generator 118, 206) electrically connected to the electric switch for generating the second signal in response to the output of the electric switch.

In the system, the electric switch is provided on an member (200) attached to a steering column of the vehicle.

In the system, the control means includes: a microprocessor for generating a command at a predetermined voltage level to the hydraulic mechanism (64) in response to the second signal such that the selected range is established.

The system further includes: a third signal generating means (range signal generator 118, 206) for generating a third signal (FWD, R) indicating that the forward-running range or a reverse range is selected by the vehicle operator; a failsafe circuit (110*a*) for inputting the third signal and for operating the hydraulic mechanism in response to the third signal when the command generated by the microprocessor is not at the predetermined voltage level.

In the system, the electric switch (402, 404) is a photo-sensor.

In the system, the electric switch (502, 504) is a touch-sensor.

In the system, the electric switch (304, 306) is provided at a floor of the vehicle close to the vehicle operator seat to be manipulated by a foot of the vehicle operator.

It should be noted that, although the invention has been described with reference to the CVT-type transmission, the invention will also be applied to a multi-step-geared transmission with or without a torque converter.

It should further be noted that, although the invention has been described with reference to the CVT having the start clutch, the invention will also be applied to that having, instead of the start clutch, a torque converter. An electromagnetic clutch may be used as the start clutch.

It should further be noted that, although the invention has been described with reference to the belt-type CVT having the start clutch, the invention will also be applied to the other type of CVT including the toroidal-type.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft when a forward-running range is selected by a vehicle operator, wherein the improvement comprises:

a first range selecting means provided at a position close to the vehicle operator seat of the vehicle to be manipulated by the vehicle operator and mechanically connected to a parking mechanism adapted to be connected to the output shaft, for enabling operation, in response to manipulation by the vehicle operator, of the parking mechanism to lock the output shaft such that a parking range is established;

a first signal generating means for generating, in response to operation of the parking mechanism, a first signal indicating that the parking range is selected by the vehicle operator;

second range selecting means provided at a position close to the vehicle operator seat to be manipulated by the vehicle operator and electrically connected to a hydraulic mechanism of the automatic transmission, for generating a second signal indicating a manual range selected by the vehicle operator, the selected range being from a group of manual ranges including at least the forward-running range and a neutral range; and control means for controlling operation of the hydraulic mechanism in response to the second signal such that the selected range is established, when the first signal is not generated.

2. A system according to claim 1, wherein the second range selecting means includes:

an electric switch provided at the position close to the vehicle operator seat and generating an output in response to manipulation by the vehicle operator; and second signal generating means electrically connected to the electric switch for generating the second signal in response to the output of the electric switch.

3. A system according to claim 2, wherein the electric switch is provided on a member attached to a steering column of the vehicle.

4. A system according to claim 1, wherein the control means includes:

a microprocessor for generating a command at a predetermined voltage level to the hydraulic mechanism in response to the second signal such that the selected range is established.

5. A system according to claim 4, further including:

a third signal generating means for generating a third signal indicating that the forward-running range or a reverse range is selected by the vehicle operator;

a failsafe circuit for inputting the third signal and for operating the hydraulic mechanism in response to the third signal when the command generated by the microprocessor is not at the predetermined voltage level.

6. A system according to claim 3, wherein the electric switch is a photosensor.

7. A system according to claim 3, wherein the electric switch is a touch-sensor.

8. A system according to claim 2, wherein the electric switch is provided at a floor of the vehicle close to the vehicle operator seat to be manipulated by a foot of the vehicle operator.

\* \* \* \* \*